US008269664B2

(12) United States Patent
Daum

(10) Patent No.: US 8,269,664 B2
(45) Date of Patent: Sep. 18, 2012

(54) COVERT LONG RANGE POSITIVE FRIENDLY IDENTIFICATION SYSTEM

(75) Inventor: Michael D. Daum, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 21 days.

(21) Appl. No.: 12/076,339

(22) Filed: Mar. 17, 2008

(65) Prior Publication Data

US 2009/0079616 A1    Mar. 26, 2009

Related U.S. Application Data

(60) Provisional application No. 60/960,219, filed on Sep. 20, 2007.

(51) Int. Cl.
*G01S 13/78* (2006.01)
(52) U.S. Cl. ............................. 342/45; 342/44
(58) Field of Classification Search .............. 342/45
See application file for complete search history.

(56) References Cited

U.S. PATENT DOCUMENTS

| | | | | |
|---|---|---|---|---|
| 4,240,727 A * | 12/1980 | Lermann et al. | ............... | 396/119 |
| 4,713,533 A * | 12/1987 | Bremer et al. | ............. | 250/203.1 |
| 4,814,769 A * | 3/1989 | Robin et al. | ..................... | 342/45 |
| 5,274,379 A * | 12/1993 | Carbonneau et al. | ........... | 342/45 |
| 5,280,287 A * | 1/1994 | Evans | ............................ | 342/45 |
| 5,299,227 A * | 3/1994 | Rose | ................................ | 342/45 |
| 5,396,243 A * | 3/1995 | Jalink et al. | ...................... | 342/54 |
| H1606 H * | 11/1996 | Gelnovatch et al. | .......... | 340/505 |
| 5,686,722 A * | 11/1997 | Dubois et al. | .................. | 250/226 |
| 5,796,362 A * | 8/1998 | Ayasli et al. | ....................... | 342/6 |
| 5,870,215 A * | 2/1999 | Milano et al. | ................. | 398/108 |
| 6,097,330 A * | 8/2000 | Kiser | .............................. | 342/45 |
| 6,450,816 B1 * | 9/2002 | Gerber | ............................. | 434/11 |
| 6,493,123 B1 * | 12/2002 | Mansell et al. | ............... | 398/169 |
| 6,512,478 B1 * | 1/2003 | Chien | ...................... | 342/357.25 |
| 6,954,302 B2 * | 10/2005 | Sayyah et al. | ................. | 359/291 |
| 2001/0035995 A1 * | 11/2001 | Ruggiero | ....................... | 359/152 |
| 2003/0147651 A1 * | 8/2003 | Roes et al. | ..................... | 398/108 |
| 2004/0222917 A1 * | 11/2004 | Butler | ............................. | 342/45 |
| 2005/0024634 A1 * | 2/2005 | Barker et al. | ................. | 356/301 |
| 2007/0085725 A1 * | 4/2007 | Hayles et al. | .................. | 342/45 |
| 2007/0183782 A1 * | 8/2007 | Farr et al. | ...................... | 398/104 |
| 2009/0074422 A1 * | 3/2009 | Stewart | ......................... | 398/118 |

* cited by examiner

*Primary Examiner* — Timothy A Brainard
(74) *Attorney, Agent, or Firm* — Birch, Stewart, Kolasch & Birch, LLP

(57) ABSTRACT

The present invention pertains to a portable repeater device for use by friendly forces in a combat theater. The repeater device includes a sensor that receives an interrogator signal, coded or un-coded, from a friendly interrogator, such as an airborne attack or search and rescue vehicle, and a transmitter that transmits a coded or uncoded beacon at a covert wavelength outside the typical night-vision spectrum back to the interrogator in response. Because the transmission wavelength of the repeater signal is covert and outside typical night-vision capabilities, the system limits the ability of enemy forces to locate friendly forces employing such signaling beacons through typical night-vision equipment.

29 Claims, 7 Drawing Sheets

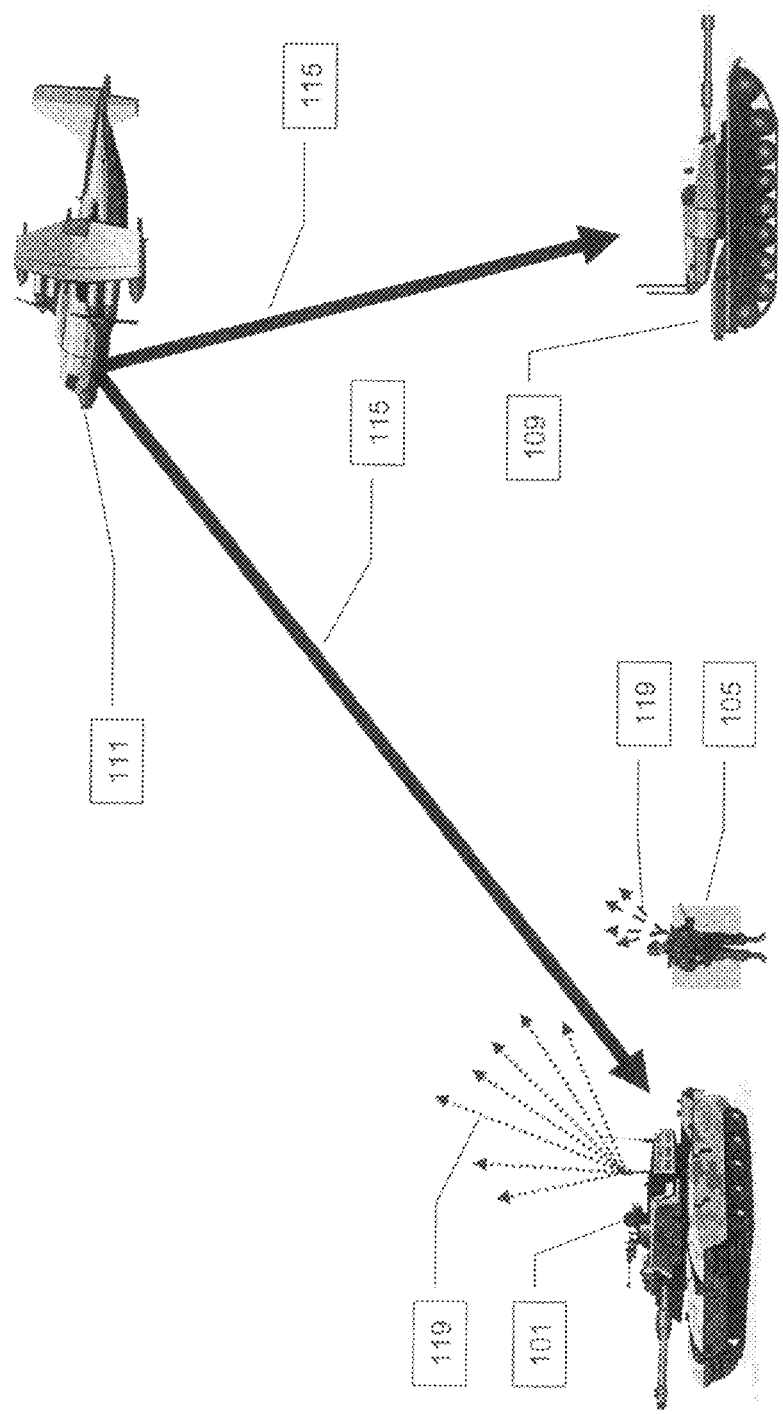

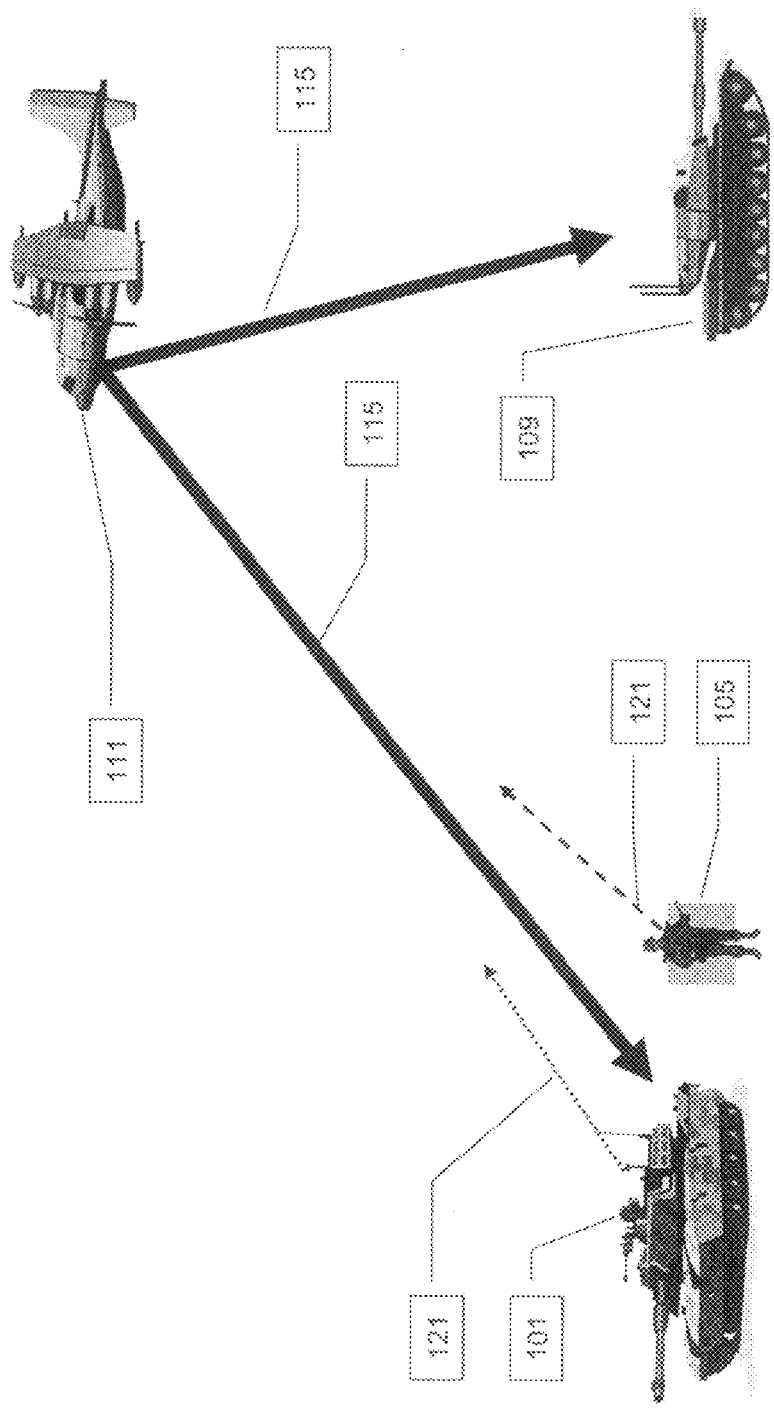

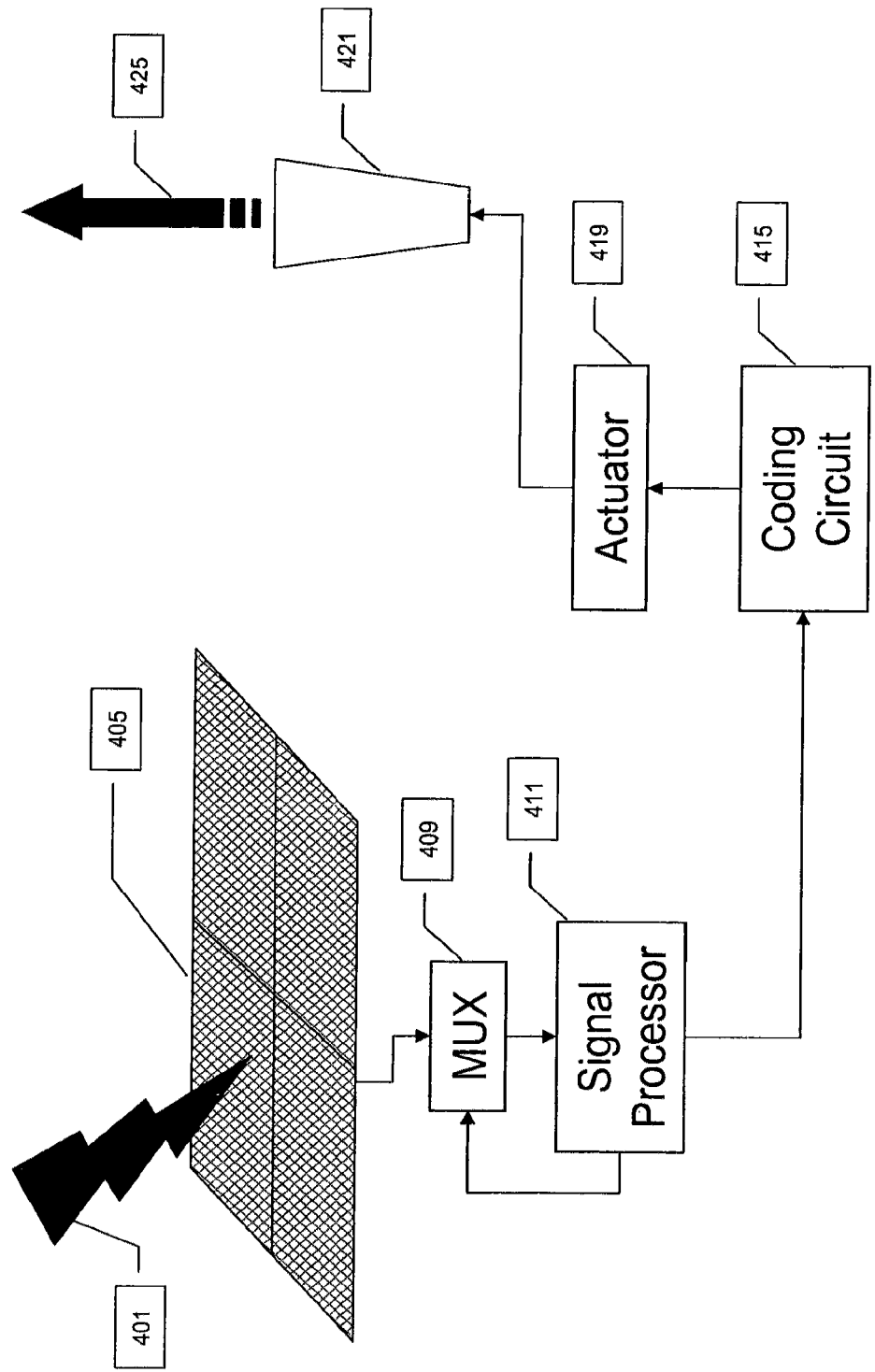

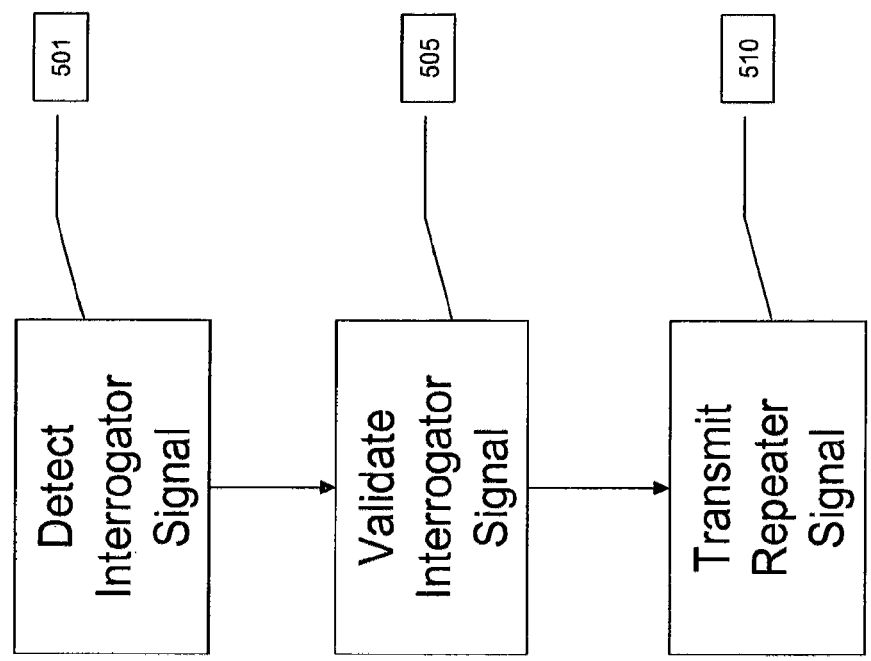

COVERT LONG RANGE POSITIVE FRIENDLY IDENTIFICATION SYSTEM

PRIORITY

This application claims priority under 35 U.S.C. §119(e) on U.S. Provisional Application No. 60/960,219 filed on Sep. 20, 2007, the entire contents of which are hereby incorporated by reference.

TECHNICAL FIELD OF THE INVENTION

The present invention relates to the detection of potential targets in a scene. Specifically, the present invention relates to identifying potential targets through the use of repeater beacon devices that respond upon detecting an interrogator signal.

BACKGROUND

The problem of friendly fire is one that is as old as the first war ever fought. Combat theaters throughout history and throughout the world have presented the problem of discriminating friend from foe in the heat of battle. This problem has become ever more acute as weapons systems become more powerful and more sophisticated and soldiers operate evermore independently.

The first and best protection from friendly fire is information. Knowing where troops and resources are on a battlefield enables commanders and field leaders to operate more effectively and avoid accidentally firing at allies or non-combatants. Such information is usually channeled and directed through a central command center that relays information to various field units and helps them to coordinate their movements. While effective, it offers no back-up system to validate that the information is correct or to provide supplemental data in case troops and resources are forced to move into areas where they were not originally meant to go.

One solution to the issue of friendly fire, especially during night time, is the use of infra-red or GPS beacons. Soldiers in the field could use such beacons to identify themselves and signal their position to ground support aircraft operating in the area. This provides pilots and gunners in the airplanes an additional way to make sure they did not fire at or near friendly positions.

The use of conventional infra-red and GPS beacons has recently become problematic as most military and paramilitary organizations now have access to night-vision technology, including infra-red sensors and detectors, and GPS technology. Soldiers in combat theaters need a new way to identify themselves and their positions to ground support aircraft without alerting enemy combatants to their position. The system must also be capable of operating over long distances so that long-range support aircraft, operating sometimes as far away as three or more miles from the combat scene, will be able to detect and identify friendly troops and resources in the battlefield scene.

SUMMARY

The present invention is directed at solving the above problem through a system comprised of an interrogator signal, a portable repeater device, and a repeater signal detector. Friendly forces in a combat theater would be equipped with the repeater device. The repeater device would include or be connected to a sensor that would receive an interrogator signal, coded or un-coded, from a friendly interrogator, such as an airborne attack or search and rescue vehicle.

Upon detecting the interrogator signal, the friendly repeater unit transmits a coded or uncoded beacon at a covert wavelength outside the typical night-vision spectrum, such as between 1.45 µm and 1.6 µm. Transmission may be accomplished via appropriately lensed solid state diode emitters.

This repeater signal is detected by a repeater signal detector device which may be co-located with the friendly interrogator. Because the transmission wavelength of the repeater signal is covert and outside typical night-vision capabilities, the system limits the ability of enemy forces to locate friendly forces employing such signaling beacons through typical night-vision equipment.

The interrogator signal may be a highly directional signal aimed at a specific target, a beam used to sweep an entire battlefield area, or a broad-angle signal meant to cover a wide field of view. The interrogator signal may cover a range of frequencies, but will preferably be invisible to conventional battlefield-use infra-red, GPS or RADAR technologies.

The portable repeater device consists of a detector and a transmitter that may be integrated into a combat system comprising other components, or that may be built as a separate hand-held or selectively-mountable unit. The detector may be configured to receive broad-area interrogator signals, highly directional interrogator signals, or both. The repeater signal generated by the transmitter may be highly directional or it may be a broadcast beacon. The repeater may also be activated manually in the absence of an interrogator signal. The repeater signal may also cover a range of frequencies but will preferably be of a frequency different from the interrogator signal and also invisible to standard (visible spectrum) video and photography, conventional battlefield-use infra-red, GPS or RADAR technologies.

The repeater unit may also be used to mark a target or employed as a guide marker for en-route navigation. The fundamental problem solved by the invention is one of signaling position information to in-theater friendly forces without alerting enemy forces and without requiring an intermediate system or party to convey information between the signaling and signaled parties. This signaling may be used to identify friendly forces, mark routes, mark targets, or for any other purpose suitable for such a system.

The repeater signal may also be coded or uncoded. A coded repeater signal may be configured to convey specific information such as a certain position or characteristics of the entity carrying the repeater. The repeater may be coded such that it transmits pulses based on a time code and may also be equipped with an auto reset timer. This may prevent unwanted activation and enable the repeater to reset itself should it become activated unintentionally.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1B shows a scenario where friendly forces are transmitting a broadcast repeater signal in response to a directed interrogator signal;

FIG. 1C shows a scenario where friendly forces are transmitting a directed repeater signal in response to a directed interrogator signal;

FIG. 4 shows a more detailed schematic of the detector and transmitter elements; and FIG. 5 shows a high-level flowchart of an embodiment of an interrogator signal detection and repeater signal transmission process.

The drawings will be described in detail in the course of the detailed description of the invention.

DETAILED DESCRIPTION OF THE INVENTION

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

Figure 1A:
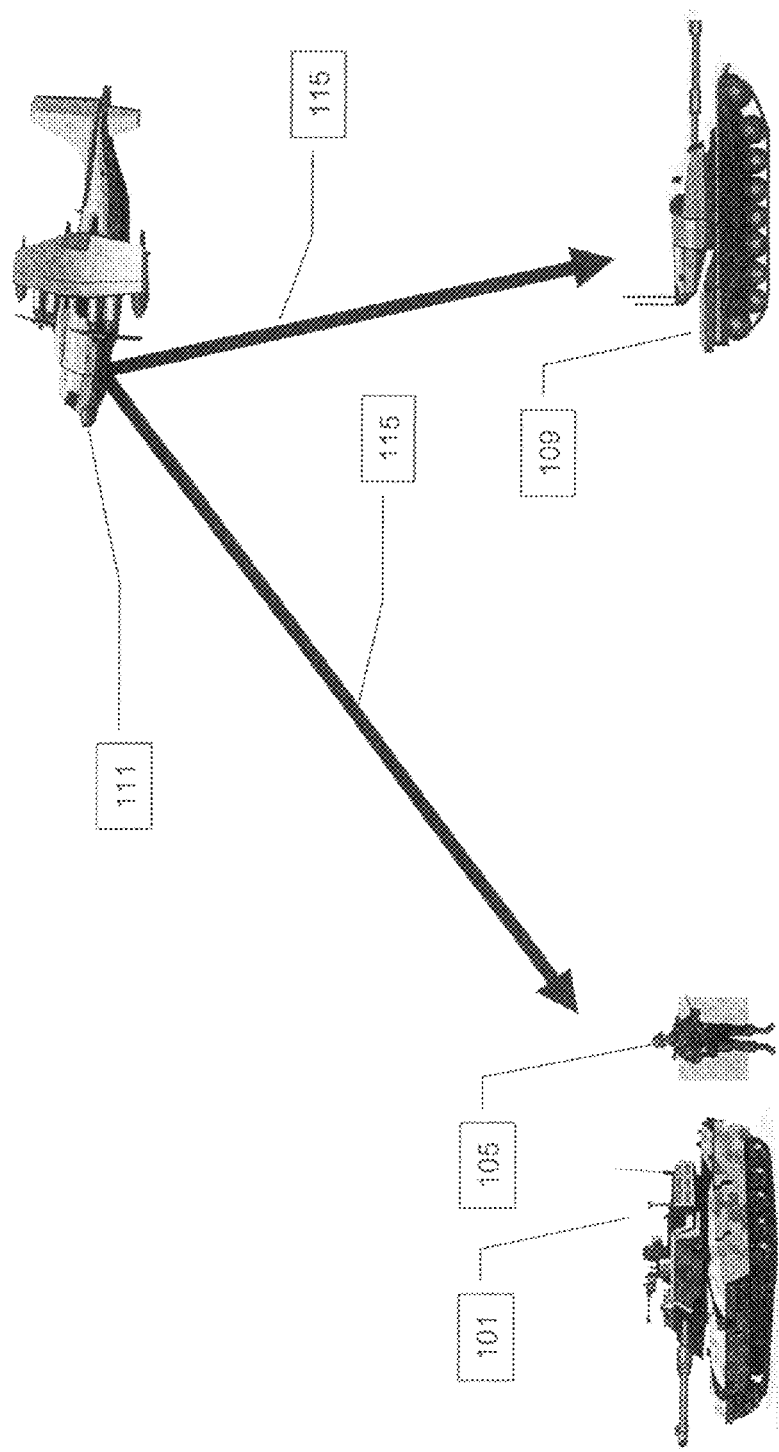
FIG. 1A shows a scenario where an aircraft is transmitting a directed interrogator signal to three potential targets in a combat theater.

An embodiment of the inventive system is shown in FIGS. 1A-1C. In FIG. 1A, the interrogator and signal detector device are both located in a ground support aircraft 111 monitoring a battlefield. The aircraft transmits a highly directional interrogator signal 115 to each potential target on the battlefield. In this embodiment, the potential range of targets for the ground support aircraft 111 include friendly armored 101 and infantry targets 105 as well as hostile armored 109 targets.

Alternative embodiments of the inventive system may involve an interrogator beam that sweeps across a target area. This has the effects of reducing the active time a sensor operator in the aircraft needs to spend on an area and allowing the interrogator signal to operate from a greater distance. Also, a sweep can be accomplished with a much less powerful system, allowing it to be smaller and cheaper. A sweeping interrogation technique may allow the sensor operator to take advantage of pre-mission intelligence.

FIG. 1B depicts friendly forces 101, 105, equipped with portable repeaters transmitting a broadcast beacon signal 119 in response to the highly directional interrogator signal 115 from the ground support aircraft 111. Hostile targets 109 are not supposed to be equipped with a portable repeater device and do not broadcast a repeater beacon in response to the interrogator signal 115, enabling the sensor or weapons operator in the support aircraft 111 to positively identify the hostile armored target 109 as a candidate for attack.

Alternative embodiments of the invention may be configured to run autonomously without constant operator oversight. Yet further alternative embodiments may entail transmitting detected repeater signals to command centers or ground relay stations for further analysis.

As shown in FIG. 1C, the repeater signal 121 may also be highly directional, affording a further level of protection by making it even more difficult for enemy forces to detect the repeater signal. The operating wavelength of the repeater signal in these examples is approximately 1.5 μm, which is outside the visible spectrum and also outside the capability of commercially available infra-red imaging equipment. Operation in the 1.5 μm spectrum is more complex and expensive than in the near infra-red (NIR) spectrum, where anyone can obtain cheap night-vision equipment. Making the repeater signal directional makes it unlikely that the signal will be detected by enemy forces even if they do have access to 1.5 μm SWIR imaging technology.

The interrogator signal 115 in an embodiment of the present invention is generated by a highly directional LASER target designation system already in use in several long-range ground support aircraft. The LASER signal, which has an operating wavelength of 0.85 μm is detected by the repeater device, which responds with an electro-optical signal having an eye-safe, SWIR wavelength range of between 1 and 2 μm. Wavelengths in this range are generally outside the detection spectrum of typical battlefield IR imaging systems and are also unlikely to cause eye damage in the event a soldier looks directly at the repeater while it is transmitting a signal. The highly directional character of these wavelengths also makes them well-suited for covert operations where there are significant risks associated with unwanted detection of ground forces.

Alternative embodiments of the system may employ any number of signal emission devices operating at any desired wavelength or range of wavelengths. Possible candidates for interrogator signals in such systems may include RADAR, microwave, AM or FM radio, visible light, however covert transmission wavelengths are preferred. Any highly directional targeting system may be adapted to transmit an interrogator signal to a fielded repeater device so long as the repeater is properly configured to detect the interrogator signal and transmit a response signal.

Figure 2:
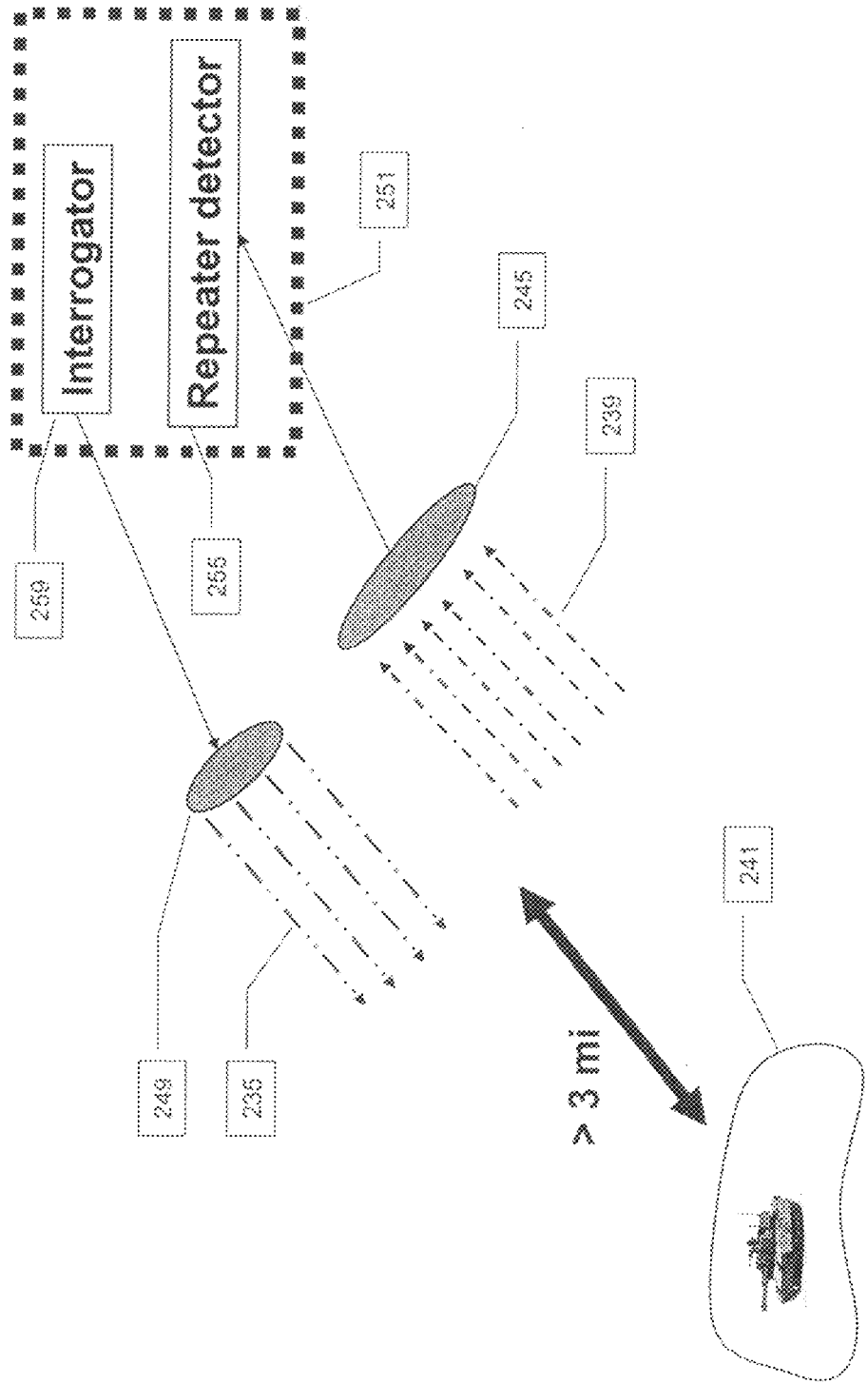
FIG. 2 shows an embodiment of an interrogator signal generation and repeater signal detection system.

FIG. 2 depicts an embodiment of an interrogator signal generation and repeater signal detection system 251 that may be carried by a ground support aircraft. This embodiment takes advantage of two existing, distinct sensor systems available on several long-range ground support aircraft currently operating in combat theaters. An 0.85 μm imaging system 259, which is part of a targeting system for a long-range weapons platform 249, already emits a highly directional beam 235 used for target detection and acquisition at ranges of over 3 miles. Repeater devices in the battlefield area 241 are configured to detect this highly directional 0.85 μm beam 235 as the interrogator signal and respond with a directional 1.5 μm beacon signal 239. This 1.5 μm signal is detected by a near-IR sensor 245 connected to a second imaging system 255 also currently available on several long-range ground support aircraft currently operating in combat theaters. This second image will clearly show a signaling beacon originating from friendly forces, allowing the weapons or sensor systems operator to eliminate such forces from their list of potential targets. In an alternative embodiment, the beacon may also be configured to respond with a directional 0.85 μm signal, allowing friendly interrogation and detection to be accomplished with one highly-directional sensor system.

Alternative embodiments of the system may also employ any number of signal emission devices in the repeater. Upon detecting an interrogator signal, the repeater device may be configured to respond with either a broadcast or a highly directional or an omnidirectional response signal. Preferred embodiments of the repeater device, employed in the embodiments of the system depicted in FIGS. 1b and 1c, contain a passive detector attuned to the expected frequency band of the interrogator signal. The passive detector is omnidirectional, so that it can detect an incoming interrogator signal from any angle within its field of detection. The sensitivity of the detector may be adjusted in various embodiments depending on whether a direction or sweeping interrogator signal is expected. Embodiments of the detector may detect an interrogator signal from a range of over 6 miles.

Figure 3:
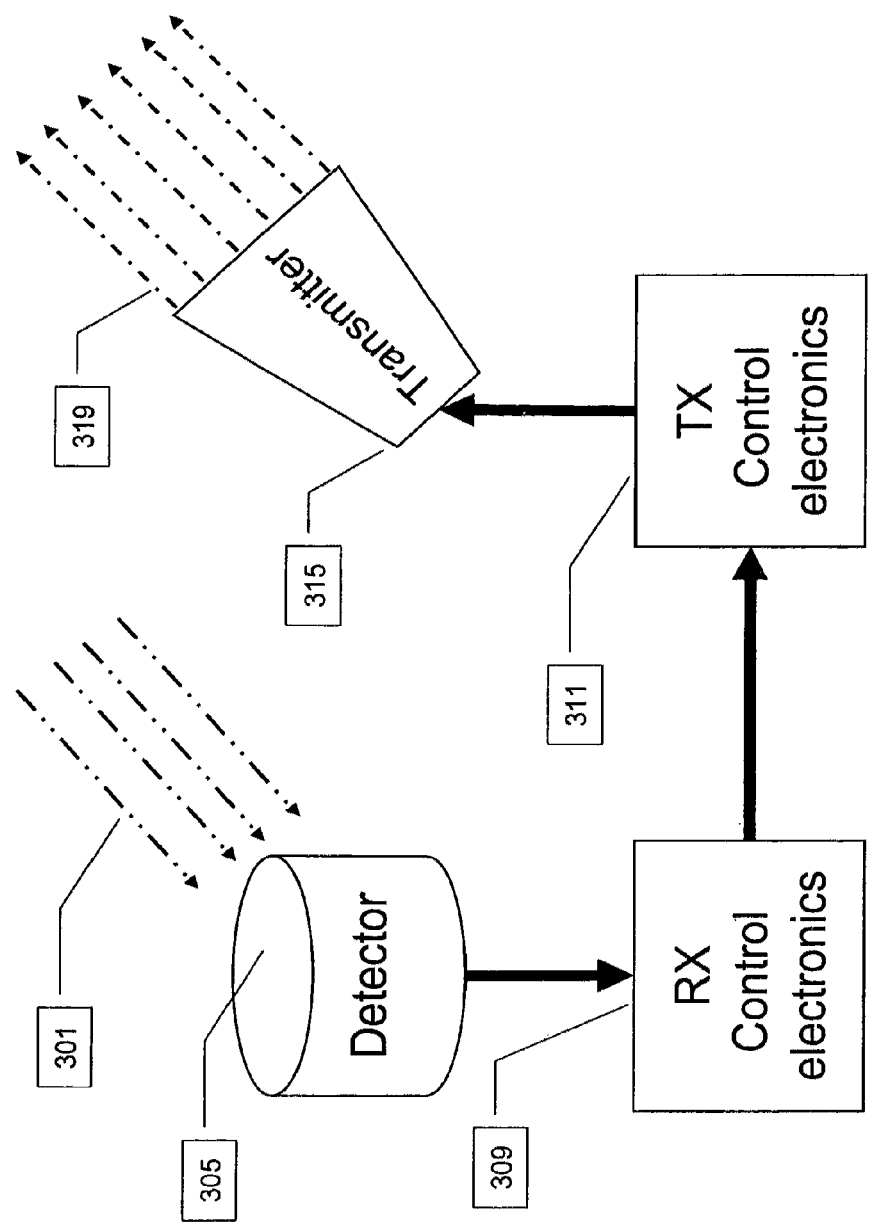
FIG. 3 shows a block diagram example of the detector and transmitter elements of a portable repeater device.

An embodiment of the portable repeater device is depicted in FIG. 3. In this embodiment, a detector device 305 is configured for omnidirectional detection of an interrogator signal 301. Upon detection of the interrogator signal, the reception control electronics 309 determine if the signal is valid by calculating the angle of incidence of the interrogator signal. A broadcast or omnidirectional signal is deemed not valid by this embodiment, which is tailored strictly for highly directional interrogator signals. Once the interrogator signal is validated an angle detection unit (not shown), the RX control electronics 309 transmit angle of incidence information, along with an activation signal, to the transmission control electronics 311.

An embodiment of an angle detection unit may comprise a detector 305 composed of photodiodes tuned to detect a specific frequency. If more than a threshold number of photodiodes, or photodiodes in a certain arrangement detect an interrogator signal, that signal may be deemed a broadcast or omni-directional signal and therefore invalid. Other embodiments of an angle detection unit may employ a four-quadrant FPA or may involve post-detection signal processing.

The TX control electronics 311 orient the transmitter 315 so that it transmits a directional beacon signal 319 back at the source of the interrogator signal. This beacon signal may be coded or uncoded. In embodiments where the signal is coded, the coding may be used to transmit information such as GPS coordinates or identity information. This helps to further validate a friendly resource by confirming that the beacon code matches the imaged resource. For example, if a coded beacon from an armored vehicle is captured by hostile infantry forces, the coded signal will identify the beacon as belonging to an armored vehicle while the image will display an infantryman carrying it, indicating that beacon may have been captured or stolen.

Embodiments of the repeater device tailored for sweeping interrogator signals or intended for broadcast beacon transmission may not require components or software to calculate the angle of incidence of the interrogator signal or to orient the transmitter. Yet further embodiments of the repeater device may be configured to only respond to appropriately coded interrogator signals, or may be configured to be constantly active, allowing for transmitter detection without an interrogator signal to activate the beacon.

One embodiment of the detector consists of a four-quadrant staring focal plane array (FPA) capable of determining an approximate angle of incidence of an incoming electro-optical (EO) interrogator signal. This angle of incidence is then passed to the transmitter portion of the repeater device, which, in this embodiment, transmits a return signal within a 5-degree range of the determined angle of incidence. The return signal is thus readily detectable by the ground support aircraft but is not broadcast omnidirectionally, making it difficult for enemy forces in the area to detect the repeater signal even if they may have the necessary equipment to do so.

An embodiment of the detector is shown in FIG. 4. This embodiment of the detector consists of a four-quadrant staring FPA 405, a multiplexer 409, and a signal processor 411. The aperture of the detector (not shown), meant in this embodiment to be mounted on top of an armored vehicle, points upward so as to detect an incoming interrogator signal 401 originating from any angle above the horizon. The direction and angle of incidence of the interrogator signal is determined by a signal processor 411 connected to the FPA through a multiplexing unit 409. The signal processor also determines the validity of the interrogator signal by checking if the interrogator signal is at the proper frequency and is coded. Frequency validation may be accomplished either by hardware means (detectors tuned only to specific frequencies) or software means (signal processing algorithms that only look for certain types of detected signals) or a combination of the two. If the interrogator signal is deemed to be valid, the signal processor passes the direction and coding information to the transmitter portion of the repeater device.

Alternative embodiments of the detector may contain different types of sensors, such as PIN photodiodes or passive RF detectors. Alternative embodiments of the detector may not attempt to ascertain the incoming angle of the interrogator signal, or they may allow a user to select between broad-area and highly-directional detection modes. Alternative embodiments of the detector may also not attempt to ascertain interrogator signal coding, or may allow the user the option of selecting between coded and uncoded detection modes.

An embodiment of a transmitter portion of a repeater device is also depicted in FIG. 4. This embodiment of the transmitter portion consists of an actuator to aim the transmission means 419, a coding circuit 415 to properly encode the response beacon, and a transmission means 421 to generate a response signal beacon 425. The transmission means in this embodiment contains an electro-optical transmitter 421 capable of sending directional signals in the SWIR spectrum 425. This signal is meant to be detected by an embodiment of a detection system located in a ground-support aircraft transmitting an interrogator signal. The interrogator signal characteristics are received by this embodiment of the transmitter portion from an embodiment of a detector portion. This embodiment of the transmitter portion receives angle of incidence and coding information to enable a proper response signal. The angle of incidence information is processed by the actuator so that it aims the transmission means in the correct direction. The coding information is processed by the coding circuit, which directs the transmission means to broadcast a specific pulse sequence or other code identifying the specific repeater device. The coding may be time-based, with the pulse frequency and intensity representing specific information about the entity carrying the repeater device. This allows for an additional level of verification so that should a repeater device designated for use on a tank be detected as being carried by a soldier or a jeep, the weapons system operator on the ground support aircraft will be able to better ascertain whether that repeater has been captured by an enemy force.

Alternative embodiments of a transmitter portion of a repeater device may transmit directional or broadcast signals in any portion of the EM spectrum, including visible light, microwaves, millimeter-waves, or radio signals. The user of the repeater may have the option to select directional or broadcast mode, or the mode of beacon transmission may be fixed. Alternative embodiments of the transmitter portion of the repeater device may allow for a user to switch between coded and uncoded response modes, or may allow the repeater to self-select a coded or uncoded response based on an incoming interrogator signal. This also provides an additional level of security and verification, allowing both the forces carrying repeaters and the weapons systems operators sending interrogator signals to filter out 'false positive' signals that respond as required to the interrogator signal, but are not properly coded.

Alternative embodiments of the repeater device may incorporate features such as GPS or IR beacons, giving users the ability to signal their status and position multiple ways to multiple parties. Yet other embodiments of the repeater device may allow for user-controlled signal transmission directions, or may be attuned to detect scattered signals as a result of a directional interrogator signal that is unable to directly signal the detector portion of the repeater device. In such an embodiment, the repeater device may be configured to vibrate or otherwise signal to the entity carrying it that a directional interrogator signal is sweeping the area but unable to make direct contact with the detector in the repeater device. Yet further embodiments of the repeater device may be configured to detect and accept interrogator signals that are broadcast instead of being highly directional. Yet further embodiments of the repeater device may include an indicator feature such as vibration, beeping, indicator lights, or signaling a separate sensor system carried by the entity carrying the repeater in order to indicate that the repeater has been activated by an interrogator signal. Yet further embodiments may allow for this indicator feature to be selectively activated and de-activated by users of the repeater.

Yet further embodiments of the repeater device may be configured to work in situations where the source of the interrogator signal is completely separate from the party detecting the repeater signal, such that the receipt of a coded or un-coded repeater signal from one direction may trigger the beacon to transmit a response signal in a different direction, or may simply cause a broadcast response. An example of such a situation may arise when ground support aircraft are meant to provide targeting information to tanks or unmanned vehicles, with the ground support craft activating repeater beacons in the area by illuminating the area with an interrogator signal, thereby allowing the tank and unmanned vehicle operators can visually discern valid targets through their sensor and targeting systems. Yet further embodiments of the repeater device may be configured to permit users of the device to selectively activate and de-activate the device regardless of the presence of an interrogator signal.

As shown in FIG. 5, an embodiment of the operating paradigm of an embodiment of the repeater device may consists of three main functional steps. The detection of an interrogator signal 501 may comprise detection of a directional, sweeping, or broadcast interrogator signal. In an embodiment where a directional interrogator signal is responded to with a directional repeater signal, the detection may also comprise detection of an angle of incidence for an interrogator signal.

In embodiments of the repeater device where an angle of incidence or a coding must be validated, the detection step 501 may be followed with a validation step 505. An embodiment of the validation step may comprise determining if a detected angle of incidence is acceptable, determining if a coding of an interrogator signal is acceptable, or determining if the wavelength range of an interrogator signal is acceptable.

Once an interrogator signal is validated, this embodiment then permits for the transmission of a repeater signal 510 in response to the valid interrogator signal. Transmission may comprise orienting the transmitter in the direction of an incoming interrogator signal, selecting a coding or a frequency range for transmitting a repeater signal, and actual signal transmission of the repeater signal. Signal transmission may be in a directional or a broadcast mode, or any other applicable or appropriate transmission mode.

Alternative embodiments of the repeater device may employ some or all of these functional steps, and may also include additional steps such as alerting a user of the repeater device or permitting for manual operation of the repeater device.

Only exemplary embodiments of the present invention are shown and described in the present disclosure. It is to be understood that the present invention is capable of use in various other combinations and environments and is capable of changes or modifications within the scope of the inventive concept as expressed herein. Such variations are not to be regarded as departure from the spirit and scope of the invention, and all such modifications as would be obvious to one skilled in the art are intended to be included within the scope of the following claims:

What is claimed is:

1. A method for covertly signaling the presence of a person or object in a scene to a remote interrogation and detection unit comprising:
   receiving an electro-optical interrogator signal with a repeater device located in said scene;
   validating the received interrogator signal;
   generating an electro-optical repeater signal in response to the validated interrogator signal; and
   transmitting the generated repeater signal from the repeater device, said transmitting comprising
      computing an angle of transmission based on an angle of incidence of the interrogator signal;
      generating transmitter orientation information based on said angle of transmission;
      orienting the transmitter portion according to said transmitter orientation information; and
      transmitting a repeater signal from the oriented transmitter portion.

2. The method of claim 1, said transmitting comprising broadcasting the repeater signal at a wavelength different from the interrogator signal.

3. The method of claim 1, said receiving comprising passively detecting an interrogator signal at any angle of incidence.

4. The method of claim 1, said transmitting comprising transmitting the repeater signal at a covert wavelength in a wavelength range of 1.4 µm to 1.6 µm.

5. The method of claim 1, the interrogation and detection unit being located at least one mile away from the repeater device.

6. The method of claim 1, said receiving comprising detecting an interrogator signal with a wavelength range of 0.807 µm to 0.920 µm.

7. The method of claim 1, said transmitting comprising coding the repeater signal prior to transmission.

8. The method of claim 1, said generating comprising configuring the repeater signal to convey position information or characteristics of an entity carrying the repeater device.

9. The method of claim 8, said position information including GPS coordinates.

10. The method of claim 8, said characteristics including identity information in the form of a personnel or equipment serial number.

11. The method of claim 1, said validating comprising accepting as a valid interrogation signal only a highly directional interrogator signal.

12. The method of claim 1, said transmitting a repeater signal comprising:
   transmitting a highly directional repeater signal.

13. The method of claim 1, said receiving comprising notifying a user of said repeater device that an interrogator signal may be sweeping the area but has not yet been fully received by said repeater device.

14. The method of claim 1, said validation comprising determining whether said interrogator signal is within a predetermined frequency range and, if said interrogator signal is coded, whether said coding is of a type intended for recognition by said repeater device.

15. A repeater device in a system for covertly signaling the presence of a person or object in a scene to a remote interrogation and detection unit, said system having an interrogator signal generator that generates and emits an electro-optical interrogator signal across a scene, and a signal detector that detects an electro-optical repeater signal; said repeater device comprising:

a detector portion that detects said interrogator signal, said detector portion further comprising an angle detection unit to determine the angle of incidence of an interrogator signal;
   a validation portion that validates the detected interrogator signal;
   a repeater signal generator portion that generates the repeater signal in response to the interrogator signal; and
   a transmitter portion that covertly transmits the generated repeater signal upon validation of the detected interrogator signal, said transmitter portion comprising an electro-optical signal transmitter and an actuator to orient the transmitter based on the determined angle of incident,
   wherein said interrogator signal is generated by a source at least 1 mile away from said repeater device.

16. The repeater device of claim 15, said detector portion comprising a passive, omni-directional, electro-optical signal detector.

17. The repeater device of claim 15, said transmitter portion transmitting an electro-optical repeater signal having a wavelength in a range of 1.4 μm to 1.6 μm.

18. The repeater device of claim 15, said detector portion being configured to detect an electro-optical interrogator signal with a wavelength range of 0.807 μm to 0.920 μm.

19. The repeater device of claim 15, said detector portion comprising a four-quadrant staring focal plane array.

20. The repeater device of claim 15, said transmitter portion comprising a highly directional electro-optical signal transmitter.

21. The repeater device of claim 15, said transmitter portion comprising a coding circuit to encode said repeater signal according to pre-set parameters.

22. The repeater device of claim 21, said coding circuit further comprising a data encoding unit to encode position information or characteristics of an entity carrying the repeater device into said repeater signal.

23. The repeater device of claim 15, said validation portion comprising a signal processor to decode a coded interrogator signal and determine a proper response signal to the interrogator signal.

24. The repeater device of claim 15, said angle detection unit comprising at least four photodiodes, wherein each photodiode faces a different direction.

25. The repeater device of claim 15, said repeater device being a handheld portable unit.

26. The repeater device of claim 15, said repeater device further comprising a manual override permitting user-initiated activation and de-activation of said transmitter portion.

27. The repeater device of claim 15, said repeater device further comprising a notification unit for notifying a user of said repeater device that an interrogator signal may be sweeping the area but has not yet been fully received by said repeater device.

28. The repeater device of claim 15, said transmitter portion comprising at least one solid state diode emitter and a lens.

29. A system for covertly signaling the presence of a person or object in a scene to a remote interrogation and detection unit, said system comprising:

an interrogator signal generator that generates and emits and interrogator signal across a scene, the interrogator signal comprising an electro-optical beam that said interrogator signal generator sweeps across said scene;
   the repeater device of claim 15; and
   a signal detector that detects a repeater signal wherein:
   said interrogator signal generator comprises a sensor system located in a ground-support aircraft observing a scene containing infantry or armored battlefield resources; and
   said signal detector also comprises a sensor system located in said ground-support aircraft.

* * * * *